United States Patent [19]

Lederman et al.

[11] 3,910,852

[45] Oct. 7, 1975

[54] CONDUCTIVE RESIN COMPOSITION

[75] Inventors: Burton E. Lederman, Philadelphia; John J. Reilly, Treichlers, both of Pa.

[73] Assignee: Conshohocken Chemicals, Inc., Rosemont, Pa.

[22] Filed: June 8, 1973

[21] Appl. No.: 364,061

Related U.S. Application Data

[63] Continuation-in-part of Ser. No. 126,895, March 22, 1971, abandoned.

[52] U.S. Cl. .............. 252/512; 252/518; 260/37 M; 260/38; 260/39 M

[51] Int. Cl. .............. H01b 1/02

[58] Field of Search .......... 252/512, 518; 260/37 M, 260/38, 39 M

[56] References Cited

UNITED STATES PATENTS

| | | | |
|---|---|---|---|
| 3,064,151 | 11/1962 | Rusynyk | 252/512 |
| 3,083,169 | 3/1963 | Lieda | 252/512 |

*Primary Examiner*—Maynard R. Wilbur
*Assistant Examiner*—Richard E. Berger
*Attorney, Agent, or Firm*—Weiser, Stapler & Spivak

[57] ABSTRACT

Compositions adapted to provide electrically conductive resinous solids. One composition comprises an intimate admixture of a relatively water free phenolic resin and a particulated metallic filler material selected from the group consisting of oxide coated copper, oxide coated copper alloys and mixtures thereof. A second composition has an epoxy resin intimately mixed with the phenolic resin and the particulated filler material. This invention also relates to the resinous solids formed by curing the above composition, and to methods for manufacturing such resinous solids.

10 Claims, No Drawings

CONDUCTIVE RESIN COMPOSITION

This is a continuation-in-part of our co-pending application, Ser. No. 126,895, filed Mar. 22, 1971, entitled "Conductive Resin Composition," now abandoned.

FIELD OF INVENTION

This invention relates to compositions adapted to provide an electrically conductive resinous solid, the electrically conductive resinous solids formed therefrom and to methods for manufacturing such resinous solids. More particularly, the invention relates to compositions having as an electrically conductive component thereof particulated metallic filler materials selected from the group consisting of oxide coated copper, oxide coated copper alloys and mixtures thereof; to the resinous solids made from such compositions; and to methods for manufacturing such resinous solids.

DESCRIPTION OF THE PRIOR ART

Electrically conductive coatings having a resinous binding medium with finely divided electrically conducted particles dispersed in the medium are known in the prior art.

The resinous binding mediums are electrical insulators, and therefore, a high concentration of conductive particles having extensive contact therebetween is necessary to provide a satisfactory order of electrical conductivity. The specific order of electrical conductivity desired can be provided by varying the concentrations and the electrical conductivities of the conductive particles. For example, when resistive coatings are desired, a material such as carbon black can be utilized. Resistive coatings, are, in essence, coatings of relatively low conductivity.

Coatings with high orders of conductivity are generally referred to as electrically conductive coatings to distinguish them from resistive coatings, such as those containing carbon black. These electrically conductive coatings usually employ a high concentration of finely divided metallic particles in the composition, and these particles, because they are finely divided, have a large surface to volume ratio. In electrically conductive coatings, silver particles have previously been utilized because of their high order of conductivity, because of their resistance to oxidation and because they are conductive, even with an oxide coating. However, the high cost of silver limits the widespread use of this particular metal in conductive coating compositions.

Metals, such as copper, copper alloys and mixtures thereof, have a satisfactory order of electrical conductivity. However, in finely divided form, they are readily susceptible to being oxidized. The oxide film formed on the finely divided particles is non-conducting and therefore impairs the electrical conductivity of the composition. In order to make a copper or copper alloy filled resinous compound with a relatively high order of conductivity, the non-conducting oxide coating must be removed or modified. One approach for removing or modifying the non-conductive oxide coating is suggested in U.S. Pat. No. 3,278,445. This approach involves catalyzing the epoxy resins with an excess of primary amine curing agent, such as dimethylamino propyl alime, diethylene triamine and triethylene tetramine. These catalysts, or curing agents, have a high toxicity, which can often cause skin rashes and other forms of skin irritations on workers who come in contact with them. In addition, the specific physical properties of the binder are affected by the amount of catalyst added. Electrically conductive solid resinous compositions made with an excess of the above catalyzing agents may not have the desired properties for specific applications. Since an excess of the curing agent must be added to remove, or modify the oxide coating of the metallic particles, one must decide whether to sacrifice conductivity in favor of certain required physical properties, and for some applications a proper balance may not be possible. In addition, the presence of excess catalyst limits the pot life of the composition to thus present a definite time limit for use.

In U.S. Pat. No. 3,083,169, a method of manufacturing electrically conductive plastics is disclosed which employs a water soluble phenolic resin which employs an amount of water sufficient to make a good electrical conductor. Such massive 'amount of water has been found to cause considerable curing problems in that the water would have to be driven off during curing which could cause such undesirable effects as cratering, pinholing, retarded cure and poor properties. There is no indication in this patent that the oxide coating of the metallic particles is treated in any way to obtain the desired electrical conductivity.

In U.S. Pat. No. 3,064,151, a metal coated with an epoxyphenolic mixture is set forth wherein an epoxy resin is employed for conductivity purposes. In this system, electrical conductivity must be achieved either by first removing the oxide coating by treating the copper powder (no mention is made of this) or else, the metal is first tamped to mechanically enhance the conductive qualities of the oxide coated metallic powder. There is no indication that the oxide coating on the metallic powder is reduced within the system.

This invention relates to a composition adapted to provide an electrically conductive resinous solid comprising an intimate admixture of a phenolic resin and a particulated filler material selected from the group consisting of oxide coated copper, oxide coated copper alloys and mixtures thereof.

The phenolic resins or other aldehyde resins utilized in this invention are low viscosity, relatively water free, prepolymers which are limited to those containing formaldehyde. All references in this application to phenolic resins are intended to also include aldehyde bearing resins containing formaldehyde.

Additionally, the use of urea formaldehyde, melamine formaldehyde, furfuryl alcohol formaldehyde, resorcinol formaldehyde, catechol formaldehyde, thiorea formaldehyde, phenol aldehyde and modifications thereof are within the scope and intent of this invention.

The binding medium can be either 100% phenolic resin or can be a mixture of phenolic resin and epoxy resin. The preferred ratio, by weight, of phenolic solids to epoxy solids is from 100:0% to about 20:80%. The particulated metallic filler material is present in the range of from about 50% to about 90%, based on the total weight of components in the composition. The most preferred range of particulated metallic filler is from about 75% to about 90% based on the total weight of components in the composition.

The compositions containing either 100% phenolic resin as the binding material or a combination of phenolic resin and epoxy resin are cured to form solid resinous compositions at temperatures in excess of 80° C.

and preferably in the range of 150° - 200° C. wherein formaldehyde is released within the system to thereby reduce or complex the oxide film on the copper, or copper alloys. These solid resinous compositions will have an electrical conductivity approaching resinous solids utilizing silver as the conductive particles. Although not required, the compositions can be cured in the presence of an acid catalyst to speed up the curing reaction.

The compositions according to this invention are economical since copper and copper alloys can be substituted for the more expensive silver. In addition, the conductive resin compositions of this invention do not require the use of a catalyst, and when an acid catalyst is used, it need not be used in excess quantities. Since excessive quantities of a curing agent need not be used, the conductive resin compositions have a fairly long shelf life, i.e. one year or more at ambient temperatures.

DETAILED DESCRIPTION OF THE PREFERRED EMBODIMENT

In a first embodiment of this invention, a conductive resinous composition is made from an intimate admixture of a phenolic resin low viscosity, relatively water free, A stage prepolymer or low polymer and a particulated metallic filler material selected from the group consisting of oxide coated copper, oxide coated copper alloys and mixtures thereof. As set forth earlier, the phenolic resins of this invention are of the type having formaldehyde as one component thereof. The phenolic resins employed are not necessarily water soluble. Typical phenolic resins which can be utilized in this invention are dimethylol phenol, tri-methylol phenol and tri-methylol allyl phenol. All of these phenolic resins are intrinsically low viscosity pre-polymers, are relatively free of or low in water content, are not necessarily water soluble and require no other resins, water additions or solvents for conductivity.

It has been found in accordance with the present invention that when a phenolic resin, such as dimethylol phenol, is cured at temperatures preferably in excess of 125° C., and, if desired, in the presence of acid, the oxide coating on the copper or copper alloys is modified in such a manner as to increase the electrical conductivity of the particulated filler particles to thereby render the resinous composition conductive. It is believed that when the phenolic resins are heated to temperatures in excess of 80° C., and preferably in the range of about 150° C. up to about 200° C., C — $CH_2$ — C bonds (methylene linkage) are formed thereby releasing formaldehyde within the system. The formaldehyde effects the conductivity by either reducing or complexing the copper oxide coating on the filler particles. When heating in the presence of an acid, the acid acts as a catalyst to speed up the curing reaction. Suitable acids include toluene sulfonic acid, methane sulfonic acid, butyl phosphoric acid, octyl phosphoric acid, and other commercially available acids suitable for accelerating the curing reaction.

In a second embodiment of the invention, an epoxy resin, frequently referred to as glycidyl polyethers or polymeric epoxides, are added to the phenolic resin. These epoxy resins have properties which make them suitable for use as coatings, bonding agents, binders and the like, and may be added in various quantities to the phenolic resin to provide the desired range of properties of a solid conductive resin for a specific application. In the preferred embodiment of this invention, the ratio of phenolic solids to epoxy solids in the resinous binder system of the composition is in a range of 100:0% to about 20 to 80%. The particulated metallic filler material is present in an amount ranging from about 50% to about 90% based on the total weight of the composition. Preferably, the particulated metallic filler material is present in an amount ranging from about 75% to about 90% based on the total weight of the composition.

Other resins such as melamine formaldehyde, silicone, alkyds, and other suitable binding materials can be used in the place of epoxy resins to vary the physical and chemical properties of the solid conductive resinous composition. Further, combinations of aldehyde bearing resins such as a phenolic and a urea, may be additionally modified with a non-aldehyde resin such as an epoxy and/or an alkyd resin.

The compositions containing epoxy resins are reacted, or cured, in the same temperature ranges as the compositions which do not contain epoxy resins. If desired, the compositions containing epoxy resins are cured in the presence of an acid, such as those referred to above.

The conductive resin compositions of this invention have many applications. For example, these compositions can be used in terminations of electrical devices and electronic components; in repairing printed circuit boards; as heat sinks; as resistance elements in low range resistors; as conductive paths for glass (e.g., automotive de-icers); as electroless plating or electroplating basis; as conductive bonding media to bond active electronic devices to glass or alumina subtrates and for any other suitable purposes.

The following examples are intended to be illustrative of the invention and are not intended to be limiting in any way on the scope afforded to the claims.

EXAMPLES

Copper powder (325 mesh particle size), phenolic resin monomer-polymer (tri-methylol phenol and tri-methylol allyl phenol), and an epoxy resin (D.E.R. 736, manufactured by Dow Chemical Company) were mixed as indicated below:

| COMPOSITION (% by wt.) | 1 | 2 | 3 | 4 | 5 | 6 | 7 | 8 | 9 | 10 | 11 | 12 |
|---|---|---|---|---|---|---|---|---|---|---|---|---|
| Phenolic | 5 | 25 | 2 | 1.5 | 10 | 7.5 | 12.5[a] | 12.5 | 25 | 25[a] | 50 | 10 |
| Epoxy | 5 | 25 | 8 | 8.5 | 40 | 42.5 | 12.5 | 12.5 | 0 | 0 | 0 | 0 |
| Copper | 90 | 50 | 90 | 90. | 50 | 50 | 75. | 75 | 75 | 75 | 50 | 90 |
| RESISTANCE (ohms) | ≤ 0.2 | >500 | 4 | >500 | 8 | >500 | ≤ 0.2 | ≤ 0.2 | ≤ 0.2 | ≤ 0.2 | ≤ 0.2 | ≤ 0.2 |

[a] — Tri-methylol phenol used in these compositions; other indicated compositions used tri-methylol allyl phenol as the base composition.

[b] — Measured over an area approximately 1'' (l) × ⅝ (w) × 3 mil (t)

The various compositions cited were cured at a temperature range of from about 150° C. - 200° C., for one-half hour to 1 hour. Each composition was checked for electrical resistance on a Wheatstone bridge and the results were as indicated above.

As can be seen from the above tabulation, the highest conductivities, i.e., lowest resistances, appear to exist when the copper alloy is present in amounts in excess of 50% by weight of the total composition, and when the ratio of phenolic solids to epoxy solids in the phenolic-epoxy resin system is from 100:0% to about 20:80%.

We claim:

1. In an electrically conductive resin composition, the combination of

A. a low viscosity, relatively water free, pre-polymer phenolic resin of the type having formaldehyde as one component thereof and selected from the group of phenolic resins which includes dimethylol phenol, tri-methylol phenol and tri-methylol allyl phenol, 1. the said phenolic resin releasing formaldehyde within the composition; and B. an intimate admixture of from 50% to 90%, by weight, of a particulated metallic filler material selected from the group consisting of oxide coated copper, oxide coated copper alloys and mixtures thereof.

2. The composition of claim 1 wherein the released formaldehyde reduces copper oxide coating on the filler material to increase the electrical conductivity of the composition.

3. The composition of claim 2 wherein the group of phenolic resin includes urea formaldehyde, melamine formaldehyde, furfuryl alcohol formaldehyde, resorcinol formaldehyde, catechol formaldehyde, thiourea formaldehyde and phenol aldehyde.

4. The composition of claim 3 and an epoxy resin.

5. The composition of claim 4 wherein the ratio by weight of phenolic resins to epoxy resins is in the range of from 100:0% to about 20:80%.

6. The method of forming an electrically conductive resin composition including the steps of A. selecting a low viscosity, relatively water free A-stage pre-polymer phenolic resin of the type having formaldehyde as one component thereof;

B. adding an intimate admixture of a particulated metallic filler material selected from the group consisting of oxide coated copper, oxide coated copper alloys and mixtures thereof;

C. curing the phenolic resin at elevated temperatures;

D. releasing formaldehyde within the system; and

E. reducing the oxide coating by employing the formaldehyde to increase the electrical conductivity of the composition.

7. The method of claim 6 wherein the elevated temperatures are in the range of between 80° C. and 200° C.

8. The method of claim 7 wherein the phenolic resin is selected from the group which includes dimethylol phenol, tri-methylol phenol and tri-methylol allyl phenol.

9. The method of claim 6 and the additional step of adding an epoxy resin to the phenolic resin prior to curing.

10. The method of claim 9 wherein sufficient epoxy resin is added to produce a ratio by weight of phenolic resins to epoxy resins of from 100:0% to about 20:80%.

* * * * *